(12) United States Patent
Tachibana et al.

(10) Patent No.: US 11,990,856 B2
(45) Date of Patent: May 21, 2024

(54) ROTATION DETECTOR AND IMAGE FORMING APPARATUS

(71) Applicant: Konica Minolta, Inc., Tokyo (JP)

(72) Inventors: Yuta Tachibana, Toyokawa (JP); Hiroyuki Yoshikawa, Toyohashi (JP); Kazumichi Yoshida, Hino (JP); Satoshi Miyajima, Tokyo (JP); Kouei Cho, Toyohashi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/854,777

(22) Filed: Jun. 30, 2022

(65) Prior Publication Data

US 2023/0008381 A1    Jan. 12, 2023

(30) Foreign Application Priority Data

Jul. 6, 2021    (JP) .................................. 2021-111994

(51) Int. Cl.
  *H02P 21/18*    (2016.01)
  *H02P 6/16*    (2016.01)
  *H02P 21/22*    (2016.01)
(52) U.S. Cl.
  CPC ................ *H02P 6/16* (2013.01); *H02P 21/22* (2016.02)

(58) Field of Classification Search
  CPC ............. H02P 6/16; H02P 21/22; H02P 21/18
  See application file for complete search history.

(56) References Cited

U.S. PATENT DOCUMENTS

| | | | |
|---|---|---|---|
| 2020/0313591 A1* | 10/2020 | Mo ......................... | H02P 6/183 |
| 2021/0028734 A1* | 1/2021 | You ..................... | H01M 8/04111 |
| 2023/0142956 A1* | 5/2023 | Yamasaki ............... | H02P 21/18 |
| | | | 318/400.02 |

FOREIGN PATENT DOCUMENTS

JP    2017112696    6/2017

* cited by examiner

*Primary Examiner* — Cortez M Cook
(74) *Attorney, Agent, or Firm* — BakerHostetler

(57) ABSTRACT

A rotation detector includes a motor, a current detector and a hardware processor. The motor includes coils of two or more phases and a rotor. The current detector detects currents flowing in coils of at least two phases among the coils of two or more phases. The hardware processor estimates an initial position of the rotor based on current values of the currents detected by the current detector to start the motor, controls an energization pattern on the phases to rotate and start the motor based on the estimated initial position, and determines whether the rotor stops or is rotating before completing the estimation of the initial position.

11 Claims, 10 Drawing Sheets

ROTATION DETECTOR AND IMAGE FORMING APPARATUS

CROSS-REFERENCE TO RELATED APPLICATIONS

This application claims priority to Japanese Patent Application No. 2021-111994 filed on Jul. 6, 2021, the entire disclosure of which is incorporated herein by reference.

BACKGROUND

Technological Field

The present disclosure relates to a rotation detector and an image forming apparatus including the rotation detector.

Description of the Related Art

There is a conventional image forming apparatus that uses a sensorless brushless motor as a drive source for some conveyance rollers of a paper conveyance mechanism to convey paper. Since sensorless brushless motors are provided with neither a Hall element to detect the magnet position (angle) of a rotor as a rotator nor a rotary encoder to detect the rotational speed of the rotor, the magnet position of the rotor is estimated from current flowing in coils of the motor to control rotation.

However, at the startup of the motor, no current flows in the coils of the motor, which stops, and hence the magnet position cannot be estimated.

There is a publicly known method of applying electric current (hereinafter may be referred to as "energization" or the like) of a fixed pattern to coils of a motor before starting the motor to forcibly fit the position of a rotor of the motor to a specific position, and then starting the motor. Meanwhile, for usages for which it is undesirable for the rotor to move before the motor starts up, there is a method of applying pulsed current to the coils about multiple electric angles, estimating the position (initial position) of the rotor from difference in slope of the pulsed current flowing at the angles, and then starting the motor. (See, for example, JP 2017-112696 A.)

SUMMARY

However, in the configuration disclosed in JP 2017-112696 A, the initial position needs to be estimated with the rotor stopped. If the initial position is estimated while the rotor is rotating by external force, current that is different from the current component desired to be detected flows by reverse voltage generated by the rotation, or with change in the position of the rotor, the pulsed current corresponding to the position of the rotor is disturbed. As a result, the initial position is wrongly estimated.

If the motor is started with the wrongly estimated position (estimated initial position), the position of the rotor and the energization pattern do not match, and the startup operation becomes unstable by the rotor behaving violently or the like. As a result, the startup time becomes long, the rotation amount at the startup deviates, and the startup fails and the motor stops accordingly, for example.

Objects of the present disclosure include providing a rotation detector that determines whether a rotor is rotating during estimation of the initial position thereof to avoid poor startup and an image forming apparatus including the rotation detector.

In order to achieve at least one of the above objects, according to a first aspect of the present disclosure, there is provided a rotation detector including:
  a motor including coils of two or more phases and a rotor;
  a current detector that detects currents flowing in coils of at least two phases among the coils of two or more phases; and
  a hardware processor that
    estimates an initial position of the rotor based on current values of the currents detected by the current detector to start the motor,
    controls an energization pattern on the phases to rotate and start the motor based on the estimated initial position, and
    determines whether the rotor stops or is rotating before completing the estimation of the initial position.

In order to achieve at least one of the above objects, according to a second aspect of the present disclosure, there is provided an image forming apparatus including:
  an image former that forms an image on paper; and
  a paper conveyor including:
    the rotation detector according to claim 1, the rotation detector detecting the rotation of the rotor included in the motor;
    a first roller pair; and
    a second roller pair disposed downstream of the first roller pair in a conveying direction to convey the paper,
  wherein the first roller pair is driven to rotate by the motor and includes a one-way clutch in a transmission mechanism,
  wherein the second roller pair is driven to rotate by a drive source different from the motor, and
  wherein the paper conveyor further includes a breakdown determiner that determines that the one-way clutch is broken in response to the rotation detector detecting the rotation of the rotor while the motor stops.

BRIEF DESCRIPTION OF THE DRAWINGS

The advantages and features provided by one or more embodiments of the present disclosure will become more fully understood from the detailed description given hereinbelow and the appended drawings that are given by way of illustration only, and thus are not intended as a definition of the limits of the present disclosure, wherein.

DETAILED DESCRIPTION OF EMBODIMENTS

Hereinafter, one or more embodiments of the present disclosure will be described with reference to the drawings. However, the present disclosure is not limited to these embodiments or illustrated examples.

Figure 1:
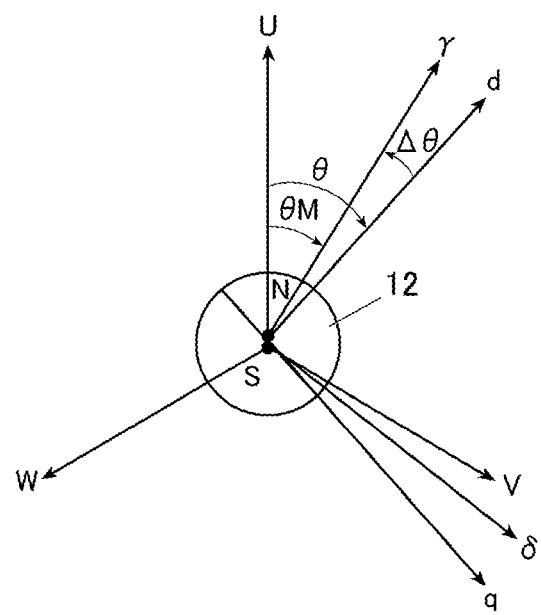
FIG. 1 is an illustration to explain a sensorless vector control system according to an embodiment(s)

First, a sensorless vector control system for driving and controlling a motor according to an embodiment(s) will be described with reference to FIG. 1. FIG. 1 shows an example of coordinate axes of a 3-phase brushless DC motor in a sensorless vector control system.

In general, in vector control, control is simplified by regarding alternating current of three phases (U-phase, V-phase and W-phase) flowing in windings of a 3-phase brushless DC motor, which is, in the present disclosure, a motor 10 (shown in FIG. 2, FIG. 3, etc.), as direct current flowing in coils 11 of two phases (shown in FIG. 2, etc.) rotating in sync with a permanent magnet, which is, in the present disclosure, a rotor 12 included in the motor 10. In this embodiment, d-axis is defined as a magnetic flux direction of the rotor 12 (permanent magnet), q-axis is defined as a direction moving forward by 90° from the d-axis, and θ is defined as an angle of the d-axis from the U-phase.

In sensorless vector control, for which a position sensor to detect the angle of the rotor 12 is not provided, it is necessary to somehow estimate positional information (angle) of the rotor 12. In this embodiment, the d-axis, q-axis and θ estimated in sensorless vector control are defined as γ-axis, δ-axis and θM, respectively, and a delay of θM from θ is defined as Δθ.

Next, configuration of drive circuitry for the motor 10 in a sensorless vector control system 1 will be described with reference to FIG. 2. The sensorless vector control system 1 is a rotation detector of the present disclosure.

Figure 2:
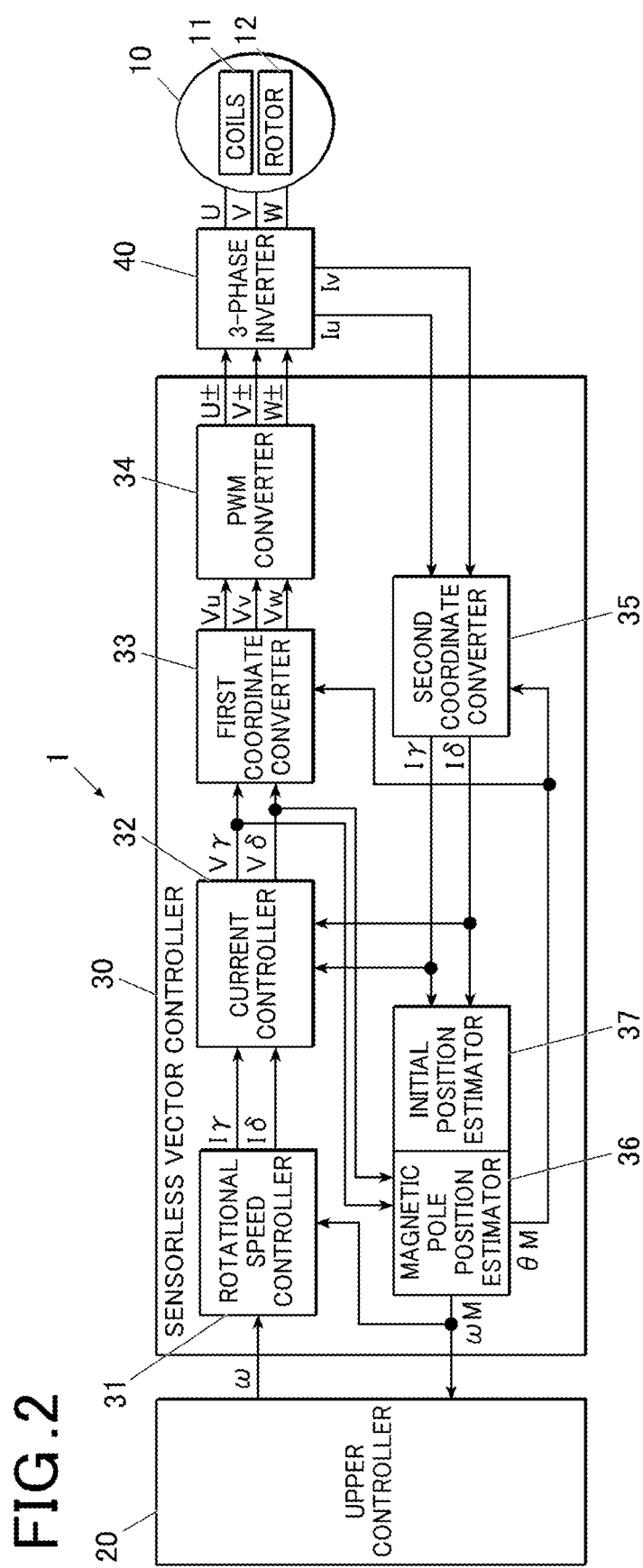
FIG. 2 shows an example of configuration of drive circuitry for a motor in the sensorless vector control system.

As shown in FIG. 2, the sensorless vector control system 1 includes the motor 10, an upper controller 20, a sensorless vector controller 30 (hardware processor) and a 3-phase inverter 40.

The motor 10 is a 3-phase brushless DC motor, and includes the coils 11 of two or more phases and the rotor 12, which is a permanent magnet.

The upper controller 20 outputs a drive command and a target rotational speed ω of the motor 10 to the sensorless vector controller 30.

The sensorless vector controller 30 includes a rotational speed controller 31, a current controller 32, a first coordinate converter 33, a PWM converter 34, a second coordinate converter 35, a magnetic pole position estimator 36 and an initial position estimator 37. The sensorless vector controller 30 generates an energization pattern(s). Although the sensorless vector controller 30 performs energization (electric current application) on the basis of an energization condition (angle to energize or energization angle) that the sensorless vector controller 30 has, the upper controller 20 may instruct the sensorless vector controller 30 about the energization condition.

The rotational speed controller 31 determines a γ-axis current command value Iγ and a δ-axis current command value Iδ with respect to the motor 10 on the basis of the target rotational speed ω received from the upper controller 20 and a rotational speed ωM of the rotor 12 estimated by the magnetic pole position estimator 36.

The current controller 32 determines a γ-axis voltage command value Vγ and a δ-axis voltage command value Vδ on the basis of the γ-axis current Iγ and the a-axis current Iδ determined by the rotational speed controller 31 to flow to/in the motor 10.

The first coordinate converter 33 converts, on the basis of the angle θM of the rotor 12 estimated by the magnetic pole position estimator 36, the γ-axis voltage command value Vγ and the δ-axis voltage command value Vδ determined by the current controller 32 into a U-phase voltage command value Vu, a V-phase voltage command value Vv and a W-phase voltage command value Vw.

The PWM converter 34 converts the U-phase voltage command value Vu, the V-phase voltage command value Vv and the W-phase voltage command value Vw obtained by the conversion by the first coordinate converter 33 into inverter drive signals U±(U+, U−), V±(V+, V−) and W±(W+, W−), and outputs these to the 3-phase inverter 40.

The second coordinate converter 35 calculates a W-phase current Iw on the basis of a U-phase current Iu and a V-phase current Iv detected by the 3-phase inverter 40. The second coordinate converter 35 also performs conversion on the basis of the U-phase current Iu, the V-phase current Iv, the calculated W-phase current Iw and the angle θM of the rotor 12 estimated by the magnetic pole position estimator 36 into a γ-axis current Iγ and a δ-axis current Iδ.

The magnetic pole position estimator 36 calculates (estimates) the angle θM and the rotational speed ωM of the rotor 12 on the basis of the γ-axis current Iγ and the δ-axis current Iδ obtained by the conversion by the second coordinate converter 35 and the γ-axis voltage command value Vγ and the δ-axis voltage command value Vδ determined by the current controller 32.

As described above, the sensorless vector control system 1 is configured to estimate the angle θM and the rotational speed ωM of the rotor 12 on the basis of the currents (U-phase current Iu and V-phase current Iv) flowing in the 3-phase inverter 40, and the motor 10 is not provided with a Hall element or an encoder (i.e., sensorless system).

The 3-phase inverter 40 receives the + and − drive signals for the U-phase, V-phase and W-phase (U±, V±, W±) and forms voltage signals for driving the motor 10.

Figure 3:
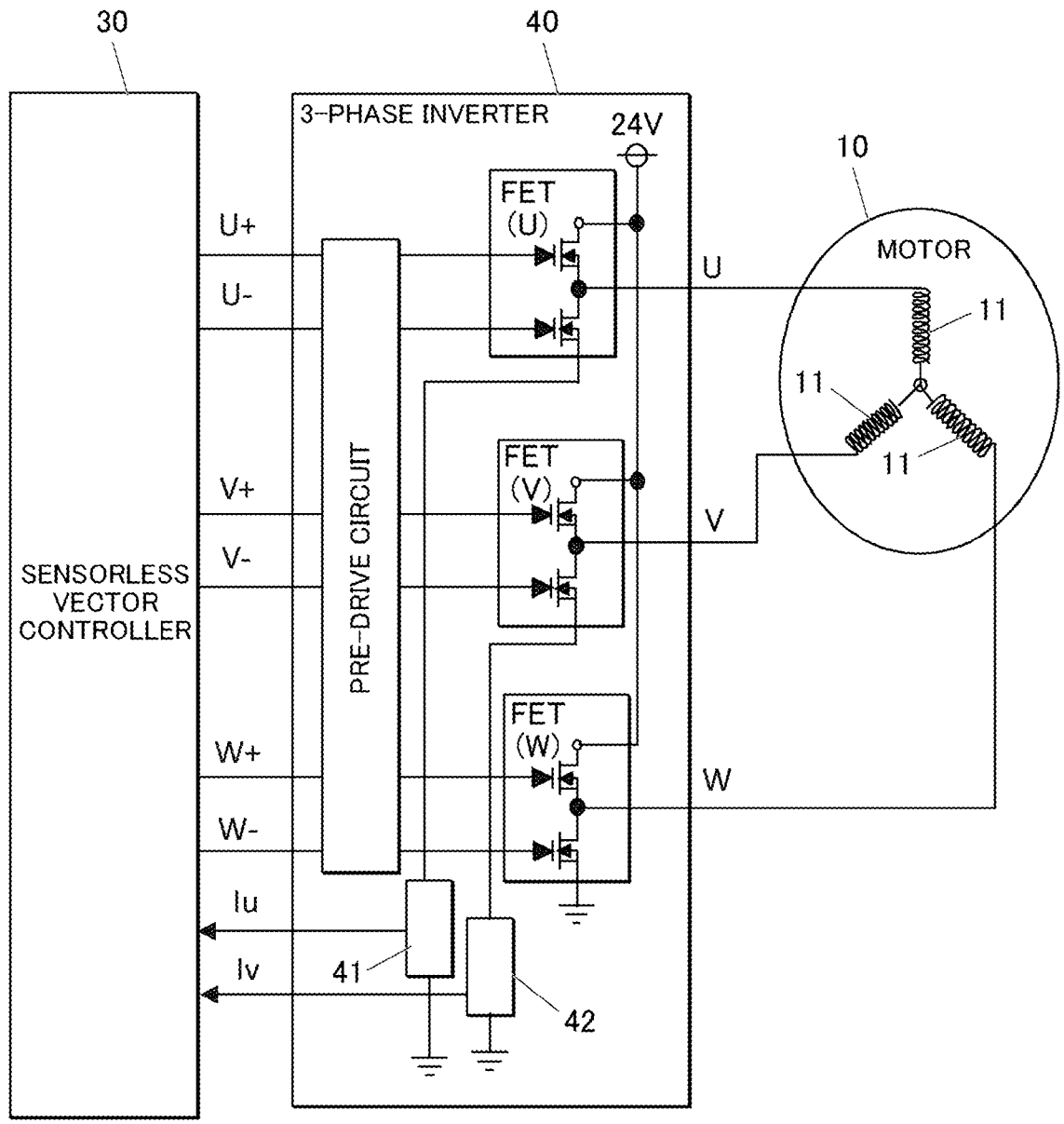
FIG. 3 shows an example of configuration of circuitry of and around a 3-phase inverter.

Among current detection methods used in the sensorless system, the method called 2-shunt system is known to detect currents flowing, among coils of three phases of the U-phase, V-phase and W-phase, in a U-phase coil 11 and a V-phase coil 11, and obtain a current flowing in a W-phase coil 11 by calculation (U-phase current+V-phase current+W-phase current=0). That is, as shown in FIG. 3, the 3-phase inverter 40 includes a U-phase current detector 41 that detects the U-phase current Iu and a V-phase current detector 42 that detects the V-phase current Iv, and outputs the detected U-phase current Iu and V-phase current Iv to the second coordinate converter 35 of the sensorless vector controller 30. The U-phase current detector 41 and the V-phase current detector 42 function as a current detector of the present disclosure that detects currents flowing in the coils 11 of at least two phases (U-phase and V-phase). The U-phase current detector 41 and the V-phase current detector 42 use resistors of a small value (1/10Ω order), and after amplifying, with not-shown amplifiers, voltages generated when currents flow therein, take these in by A/D conversion.

However, if the motor 10 stops or is rotating at a low speed, and hence the value of induced voltage is low, the angle (position) θM and the rotational speed ωM of the rotor 12 cannot be estimated by the above-described method. To deal with this, in this embodiment, the initial position estimator 37 of the sensorless vector controller 30 estimates the angle (position) of the rotor 12 while the rotor 12 stops.

Figure 4:
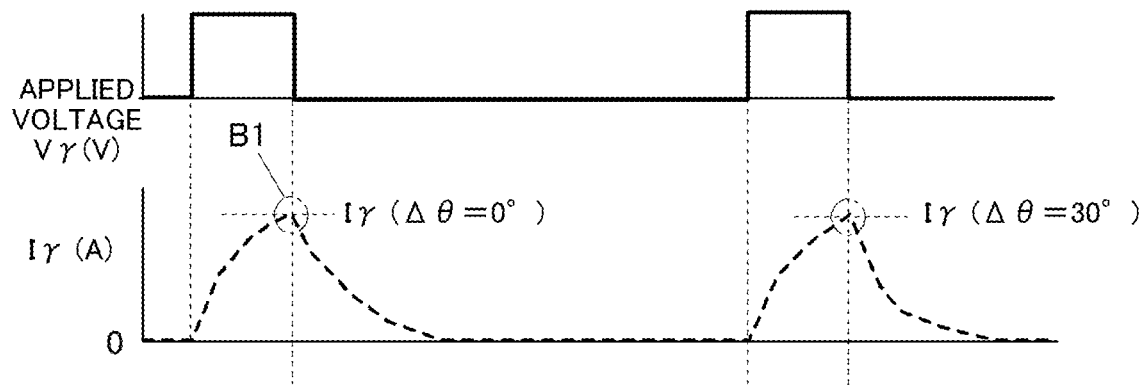
FIG. 4 shows an example of application of voltage pulse and measurement of current value for estimation of the initial position of a rotor of the motor.

There is a publically known method of estimating the position θM of the rotor 12 in a stationary state by utilizing the property that inductance of the winding of the stator subtly changes according to the stationary position of the rotor 12. FIG. 4 shows the value of the γ-axis current Iγ with respect to Δθ (delay of the position θM of the rotor 12, from the angle θ of the d-axis from the U-phase, the d-axis being the magnetic flux direction of the rotor 12) when the voltage pulse(s) of the γ-axis voltage command value Vγ being arbitrary and the δ-axis voltage command value Vδ being 0 is applied to the motor 10 in which the rotor 12 is stationary, in order to estimate the initial position.

Because the inductance of the d-axis becomes the lowest due to the magnetic field generated by the rotor 12, when Δθ=0°, the inductance of the γ-axis becomes the lowest, and the rise of the γ-axis current Iγ becomes the quickest.

In FIG. 4, the applied voltage is represented by Vγ, and the observed current value is represented by Iγ. In reality, however, the γ-axis voltage command value Vγ is converted into voltages (U-phase voltage command value Vu, V-phase voltage command value Vv and W-phase voltage command value Vw) of three phases (U-phase, V-phase and W-phase) by calculation, the voltages of the three phases are applied to the coils 11 of the motor 10 by the 3-phase inverter 40, and currents (U-phase current Iu, V-phase current Iv and W-phase current Iw) flowing in the coils 11 of the three phases are measured (W-phase current Iw is obtained by calculation (Iw=−(Iu+Iv)), and then converted into the γ-axis current Iγ by calculation.

In the example shown in FIG. 4, the current value (B1) at the point of time when application of the voltage pulse at the first electric angle (energization angle) finishes is measured and determined as a current value at the electric angle. After sufficient time elapses for the current value to return to 0, application of the voltage pulse at the next electric angle is performed. For example, while the voltage pulse is applied at every 30° from Δθ=0° up to Δθ=330°, the γ-axis current Iγ is measured.

Figure 5:
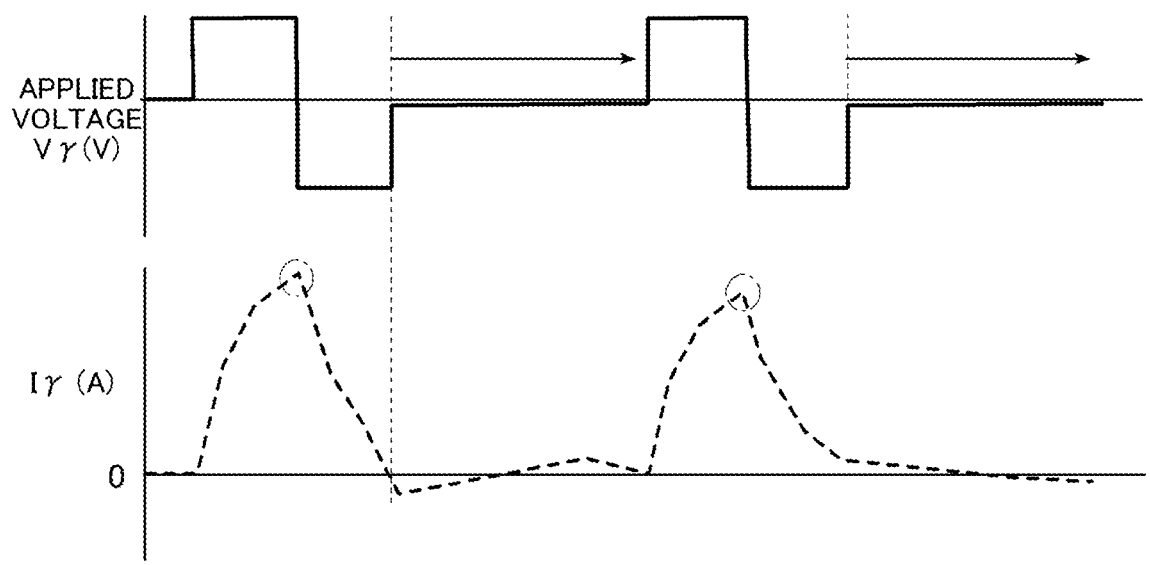
FIG. 5 shows another example of application of voltage pulse and measurement of current value for estimation of the initial position.

Unlike the example shown in FIG. 4, for usages for which after application of the voltage pulse, sufficient time for the current value to return to 0 cannot be ensured before the next application of the voltage pulse (e.g., a usage for which time for estimation of the initial position is desired to be short), as shown in FIG. 5, immediately after voltage application finishes, reverse voltage (negative voltage) may be applied to forcibly droop the current, thereby shortening the time required by the current value to return to 0.

Figure 6:
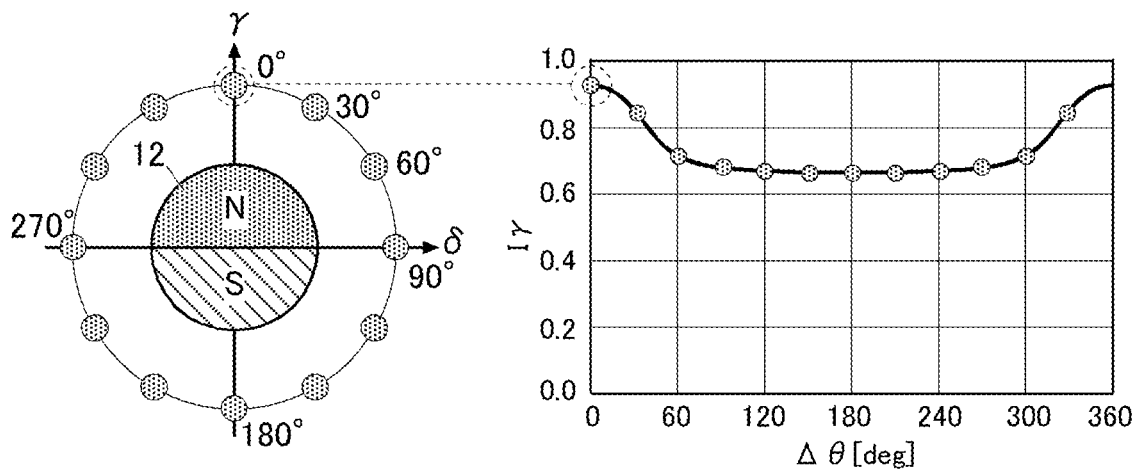
FIG. 6 shows an example of current value with respect to voltage pulse when the position of the rotor is 0°.

As in the examples shown in FIG. 4 and FIG. 5, when the γ-axis current Iγ is obtained while voltage is applied at every 30° from Δθ=0°, current data as shown by the graph(s) of FIG. 6 is obtained.

As shown in FIG. 6, in the case where the position θM of the rotor 12 is 0° (left side in FIG. 6), the current value Iγ is the highest when Δθ=0° (right side in FIG. 6).

Thus, the initial position estimator 37 can estimate the initial position of the rotor 12 by determining the angle (electrical angle) at which the current value peaks.

Figure 7:
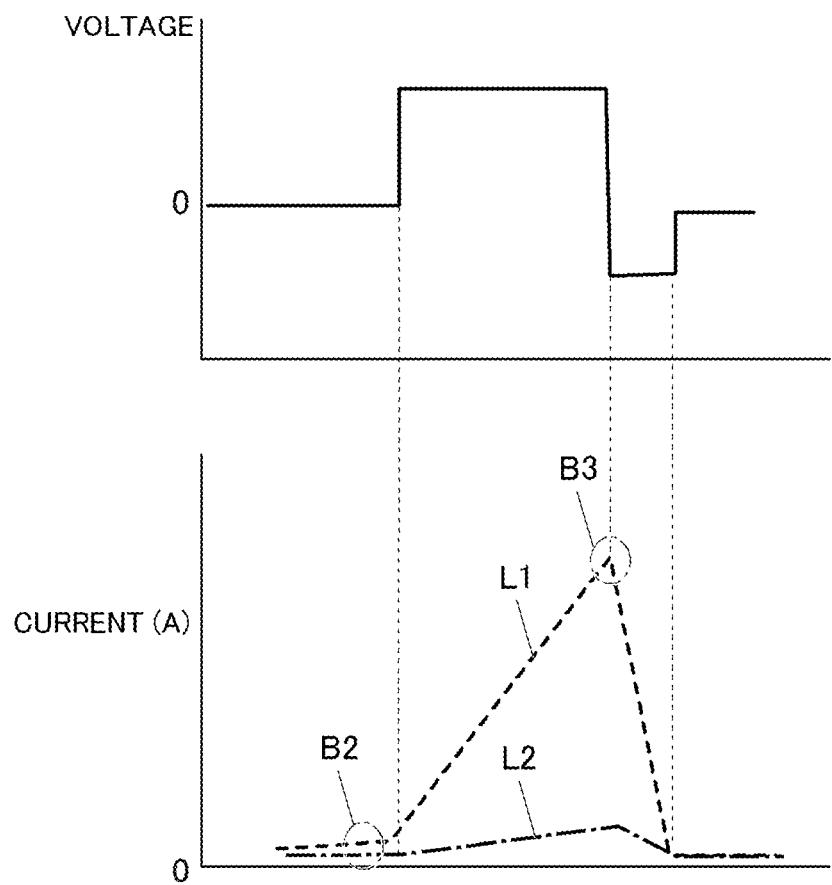
FIG. 7 shows an example of application of voltage pulse and measurement of current value in the case where the rotor is not rotating.

FIG. 7 shows an example of application of the voltage pulse and measurement of the current value in the case where the rotor 12 is not rotating. In FIG. 7, L1 represents the γ-axis current Iγ, L2 represents the δ-axis current Iδ, B2 represents the γ-axis current Iγ right before voltage application (Iγ base current), and B3 represents the γ-axis current Iγ right before energization OFF, namely, de-energization (Iγ peak current).

Normally, if the rotor 12 is not rotating during estimation of the initial position, the γ-axis current Iγ right before voltage application (Iγ base current) is around 0 [A] as shown in FIG. 7. The δ-axis current Iδ, which is not used for estimation of the initial position, stays around 0 [A] as shown in FIG. 7, regardless of the voltage application timing. This is because, in estimation of the initial position, only the γ-axis voltage command value Vγ is applied, and the δ-axis voltage command value Vδ is always 0 [V] (not applied) and the δ-axis current Iδ does not flow accordingly.

Figure 8:
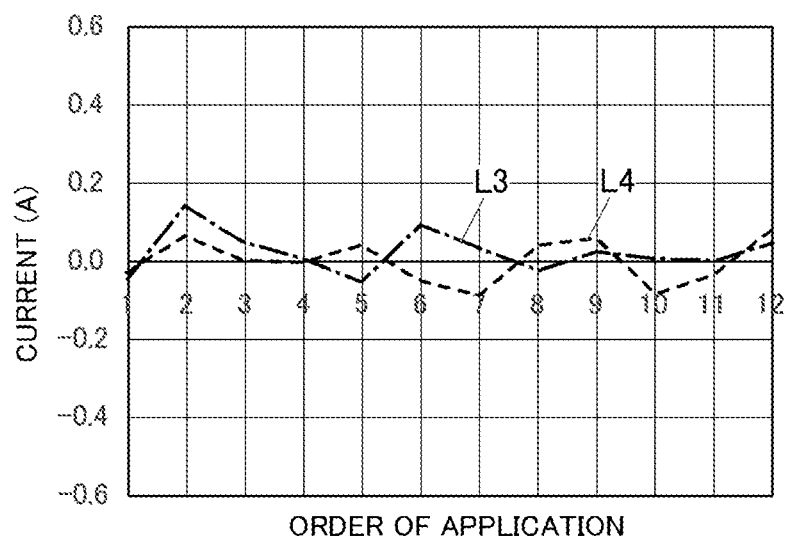
FIG. 8 shows an example of a graph in which Iγ base current and Iδ base current in estimation of the initial position while the rotor stops are plotted.

FIG. 8 shows an example of a graph in which the Iγ base current and the Iδ base current measured/calculated, in estimation of the initial position while the rotor 12 stops, at each electric angle at the timing right before voltage application are plotted. In FIG. 8, L3 represents the Iγ base current, and L4 represents the Iδ base current. The Iδ base current is the Iδ current measured at the same timing as the measurement timing of the Iγ base current. In FIG. 8, the horizontal axis shows the order of application of voltage. If it is expressed by Δθ, Δθ=(order of application−1)×30°.

Figure 9:
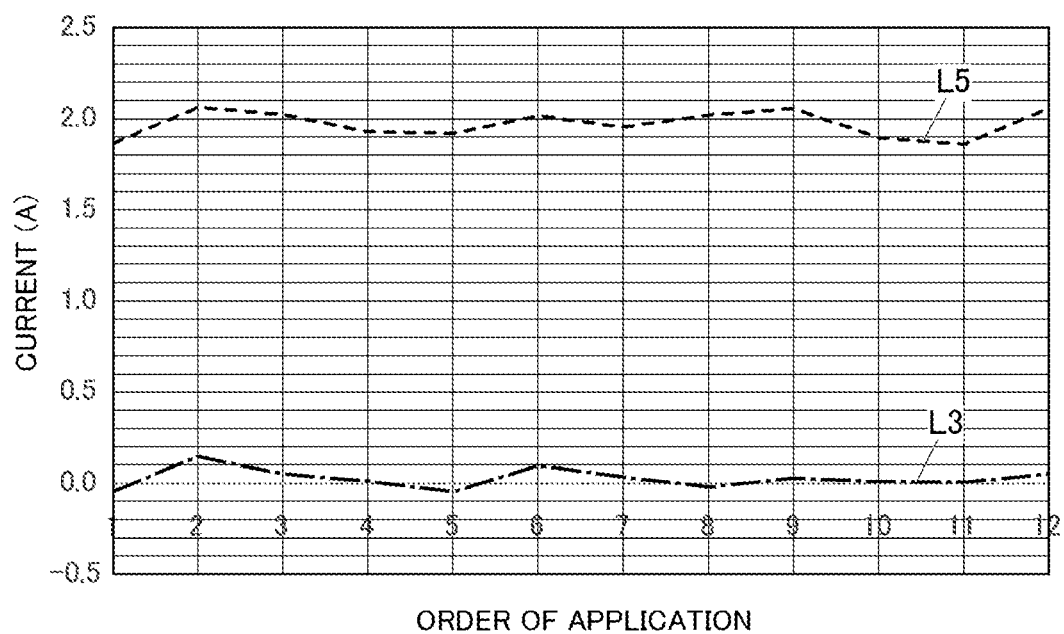
FIG. 9 shows an example of a graph in which Iγ peak current and Iγ base current in estimation of the initial position while the rotor stops are plotted.

FIG. 9 shows an example of a graph in which the Iγ peak current (γ-axis current Iγ right before de-energization) and the Iγ base current measured/calculated in estimation of the initial position while the rotor 12 stops are plotted. In FIG. 9, L3 represents the Iγ base current, and L5 represents the Iγ peak current. As shown in FIG. 9, the Iγ peak current is 10 or more times greater than the Iγ base current.

On the other hand, if the rotor 12 is rotating during estimation of the initial position, both the Iγ base current and the Iδ base current, which are supposed to be almost 0 [A], are not almost 0 [A]. This is because even at the timing when the voltage (Vγ), which is applied to estimate the initial position, is not applied, reverse voltage is generated by the rotation of the rotor 12 and current flows accordingly, so that the Iγ base current flows, and also in the δ-axis direction, in which energization is not supposed to be performed, the voltage Vδ is applied by the reverse voltage, so that the Iδ base current flows.

Figure 10A:
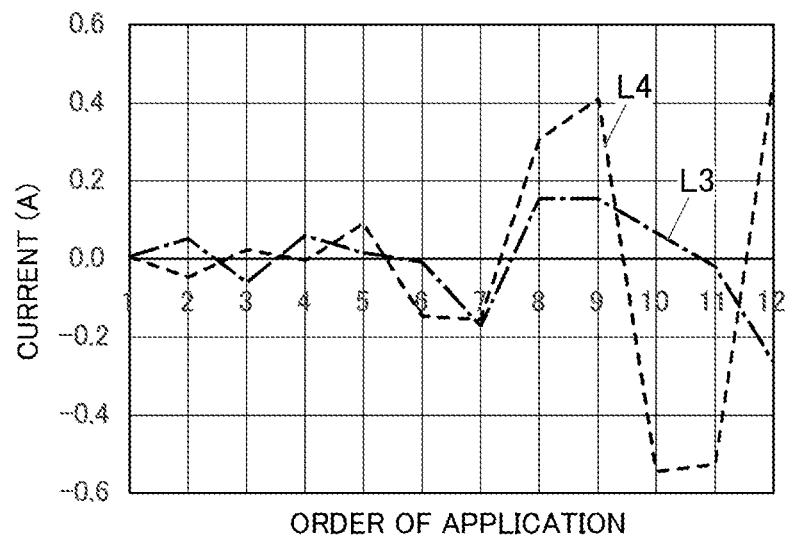
FIG. 10A shows an example of a graph in which Iγ base current and Iδ base current in the case where the rotor is rotating during estimation of the initial position are plotted.
Figure 10B:
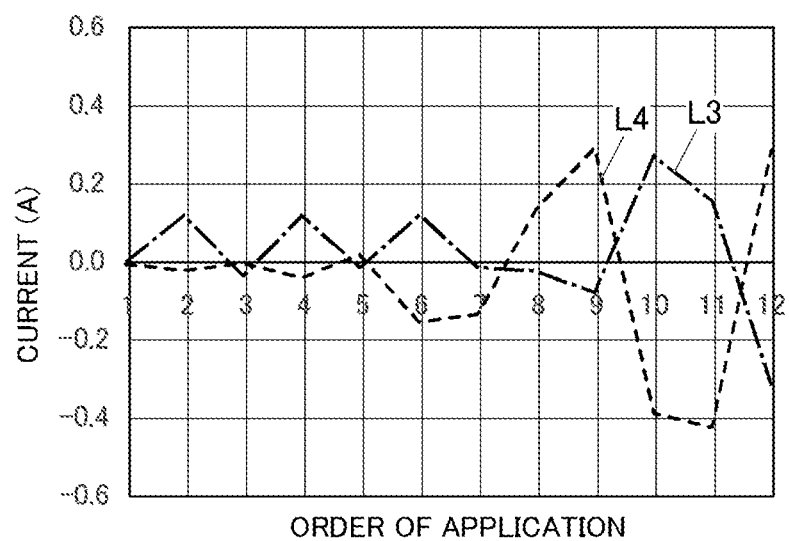
FIG. 10B shows another example of the graph in which Iγ base current and Iδ base current in the case where the rotor is rotating during estimation of the initial position are plotted.

FIG. 10A and FIG. 10B each show an example of a graph in which the Iγ base current and the Iδ base current measured/calculated at each electric angle at the timing right before voltage application in the case where the rotor 12 is rotating during estimation of the initial position are plotted. FIG. 10A shows a first example, and FIG. 10B shows a second example. In FIG. 10A and FIG. 10B, L3 represents the Iγ base current, and L4 represents the Iδ base current.

Next, operation of the sensorless vector control system 1 according to this embodiment will be described with reference to the flowchart shown in FIG. 11.

First, the sensorless vector controller 30 determines various parameters that are necessary for estimation of the initial position (Step S101). For example, the initial position estimator 37 determines γ-axis voltage value p, voltage application time m, the number of times of energization n, and de-energization (no-energization) time s. Angle increment width θs is 360°/n (θs=360°/n). The current values flowing in the coils 11 at estimation of the initial position are roughly proportional to "p×m". The value of "p×m" may be predetermined in accordance with restrictions, such as the upper limit of applicable voltage and the current value that does not move the rotor 12. In Step S101, the initial position estimator 37 resets integration variable Sg (Sg=0) in order to detect movement of the rotor 12. The initial position estimator 37 also resets various variables (the number of times of energization i, voltage application time j, current decay waiting time k, Iγ peak current maximum value max) by setting 0 (i=0, j=0, k=0, max=0).

Next, the sensorless vector controller 30 determines the energization condition for estimation of the initial position (Step S102). For example, first, the initial position estimator 37 calculates the electric angle Δθ (Δθ=i×θs). Next, the initial position estimator 37 calculates the γ-axis voltage command value Vγ on the basis of the electric angle Δθ and the γ-axis voltage value p. The δ-axis voltage command value Vδ is 0 [V].

When the outputs Vγ and Vδ of the current controller 32 and the electric angle Δθ are determined, the first coordinate converter 33 determines (calculates) the U-phase, V-phase and W-phase output duty cycles Vu, Vv and Vw. The PWM converter 34 coverts these into the PWM signals, and the switching circuit (3-phase inverter 40) energizes the motor 10.

Next, the current detectors 41, 42 detect (measure) the current values right before energization (Step S103). More specifically, the U-phase current detector 41 detects the U-phase current value Iu right before energization, and the V-phase current detector 42 detects the V-phase current value Iv right before energization.

Next, the sensorless vector controller 30 calculates the Iγ base current and the Iδ base current on the basis of the current values measured in Step S103, and integrates the absolute values thereof (Step S104). More specifically, the second coordinate converter 35 calculates the W-phase current value Iw (Iw=−Iu−Iv) on the basis of the current values (U-phase current value Iu right before energization and V-phase current value Iv right before energization) measured in Step S103, and performs conversion on the basis of the selected electric angle Δθ into the γ-axis current (Iγ base current) Iγ and the δ-axis current (Iδ base current) Iδ. Then, the initial position estimator 37 integrates the absolute values of the Iγ base current Iγ and the Iδ base current Iδ obtained by the conversion (Sg=Sg+abs(Iγ)+abs (Iδ)).

Next, the sensorless vector controller 30 determines whether the number of times of energization i is equal to or greater than n (i≥n) (Step S105).

If the sensorless vector controller 30 determines that the number of times of energization i is equal to or greater than n (i≥n) (Step S105: YES), the sensorless vector controller 30 determines that energization with respect to all the electric angles finishes, and proceeds to Step S115.

If the sensorless vector controller 30 determines that the number of times of energization i is less than n (i<n) (Step S105: NO), the sensorless vector controller 30 proceeds to Step S106.

Next, the sensorless vector controller 30 adds "1" to the number of times of energization i (i=i+1), and resets the voltage application time j by setting "0" (Step S106).

Next, the sensorless vector controller 30 starts energization (ON) on the U-phase, V-phase and W-phase, and adds "1" to the voltage application time j (j=j+1) (Step S107). If energization has been already started (ON) (Step S108: NO), the sensorless vector controller 30 continues energization.

Next, the sensorless vector controller 30 determines whether the voltage application time j is equal to or greater than m (j≥m) (Step S108).

If the sensorless vector controller 30 determines that the voltage application time j is equal to or greater than m (j≥m) (Step S108: YES), the sensorless vector controller 30 proceeds to Step S109.

If the sensorless vector controller 30 determines that the voltage application time j is less than m (j<m) (Step S108: NO), the sensorless vector controller 30 returns to and repeats Step S107 until the voltage application time j becomes equal to or greater than m.

Next, the current detectors 41, 42 detect (measure) the current values right before de-energization (Step S109). More specifically, the U-phase current detector 41 detects the U-phase current value Iu right before de-energization, and the V-phase current detector 42 detects the V-phase current value Iv right before de-energization. Thereafter, the sensorless vector controller 30 ends energization (OFF or de-energizes), and resets the current decay waiting time k by setting "0".

Next, the sensorless vector controller 30 calculates the Iγ peak current and the Iδ peak current on the basis of the current values measured in Step S109 (Step S110). More specifically, the second coordinate converter 35 calculates the W-phase current value Iw (Iw=−Iu−Iv) on the basis of the current values (U-phase current value Iu right before de-energization and V-phase current value Iv right before de-energization) measured in Step S109, and performs conversion on the basis of the selected angle Δθ into the γ-axis current (Iγ peak current) Iγ and the δ-axis current (Iδ peak current) Iδ.

Next, the sensorless vector controller 30 determines whether the Iγ peak current Iγ calculated in Step S110 is equal to or greater than max (Iγ≥max) (Step S111).

If the sensorless vector controller 30 determines that the Iγ peak current Iγ calculated in Step S110 is equal to or greater than max (Iγ≥max) (Step S111: YES), the sensorless vector controller 30 proceeds to Step S112.

If the sensorless vector controller 30 determines that the Iγ peak current Iγ calculated in Step S110 is less than max (Iγ<max) (Step S111: NO), the sensorless vector controller 30 proceeds to Step S113.

Next, the sensorless vector controller 30 sets the electric angle Δθ to the rotor position (initial position) θp (θp=Δθ), and sets the Iγ peak current Iγ calculated in Step S110 to the Iγ peak current maximum value max (max=Iγ) (Step S112). Hence, the maximum value of the Iγ peak current and the electric angle at that time can be stored.

Next, the sensorless vector controller 30 waits for the current to decay, and adds "1" to the current decay waiting time k (k=k+1) (Step S113).

Next, the sensorless vector controller 30 determines whether the current decay waiting time k is equal to or greater than s (k≥s) (Step (S114).

If the sensorless vector controller 30 determines that the current decay waiting time k is equal to or greater than s (k≥s) (Step S114: YES), the sensorless vector controller 30 determines that the current has sufficiently decayed, and returns to Step S102 to determine the energization condition for estimation of the initial position again.

If the sensorless vector controller 30 determines that the current decay waiting time k is less than s (k<s) (Step S114: NO), the sensorless vector controller 30 returns to and repeats Step S113 until the current decay waiting time k becomes equal to or greater than s.

In Step S115, the sensorless vector controller 30 determines θp as the rotor position (initial position). That is, the sensorless vector controller 30 determines the electric angle Δθ set to θp at this point of time as the rotor position (initial position).

In other words, the sensorless vector controller 30 functions as an estimator of the present disclosure that estimates the initial position of the rotor 12 on the basis of the current values detected by the current detector (U-phase current detector 41 and V-phase current detector 42) to start the motor 10. Thereafter, the sensorless vector controller 30 controls the energization pattern on the phases to rotate and start the motor 10 on the basis of the estimated initial position. The sensorless vector controller 30 functions as an energization controller of the present disclosure.

Next, the sensorless vector controller 30 determines whether the integrated value Sg (described in Step S104) of the absolute values of the Iγ base current Iγ and the Iδ base current Iδ is greater than a threshold value (Sg>threshold value) (Step S116).

If the sensorless vector controller 30 determines that the integrated value Sg of the absolute values of the Iγ base current Iγ and the Iδ base current Iδ is greater than the threshold value (Sg>threshold value) (Step S116: YES), the sensorless vector controller 30 determines that the rotor 12 is moving (rotating) (Step S117).

If the sensorless vector controller 30 determines that the integrated value Sg of the absolute values of the Iγ base current Iγ and the Iδ base current Iδ is not greater than the threshold value (Sg≤threshold value) (Step S116: NO), the sensorless vector controller 30 determines that the rotor 12 is not moving (stops) (Step S118).

In this embodiment, the estimator (sensorless vector controller 30) of the rotation detector (sensorless vector control system 1) determines whether the rotor 12 stops or is rotating before completing estimation of the initial position. In the example shown by the flowchart of FIG. 11, the estimator makes the determination at the same time as the estimation of the initial position.

This makes it possible to determine whether the rotor 12 is rotating (whether the rotor 12 is in the state of being rotated by external force) during estimation of the initial position (right before startup), and hence makes it possible to redo the estimation of the initial position as needed and avoid poor startup.

Further, the estimator determines whether the rotor 12 stops or is rotating based on the state of energization (energized or not) by the energization controller (sensorless vector controller 30) and the current values (U-phase current Iu, V-phase current Iv and W-phase current Iw) detected by the current detector (U-phase current detector 41 and V-phase current detector 42).

Figure 12:
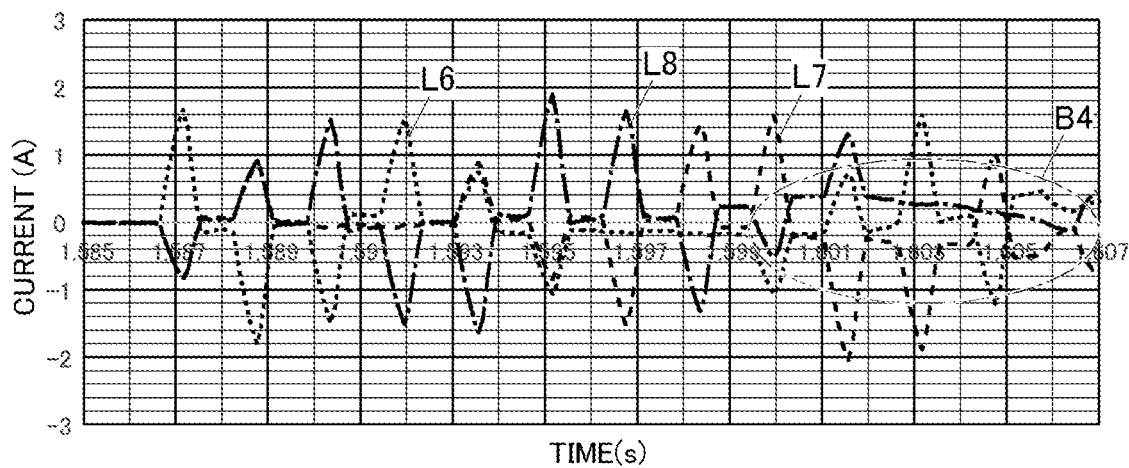
FIG. 12 shows an example of U-phase, V-phase and W-phase current values in the case where the rotor is rotating during estimation of the initial position.

More specifically, the estimator determines that the rotor 12 is rotating if the current value(s) during a period of de-energization (period in which the pulse current is close to 0 [A]) is greater than a set threshold value(s). For example, the estimator determines that the rotor 12 is rotating if the current value of at least one phase of the phases (U-phase, V-phase and W-phase) is greater than a threshold value. Normally, the current values during the period of de-energization are supposed to be almost 0 [A] if the rotor 12 stops. However, FIG. 12 shows an example where the current values increase up to about 0.4 [A]. (See B4 in FIG. 12.) In FIG. 12, L6 represents the U-phase current, L7 represents the V-phase current, and L8 represents the W-phase current. Their threshold value(s) may be value(s) preset as fixed value(s) at the time of design, or may be value(s) determined based on value(s) measured in the state in which the rotor 12 is not rotated by external force (e.g., no other drive sources are in operation).

This makes it possible to determine whether the rotor 12 is rotating during estimation of the initial position (right before startup) by using the current values generated during the estimation of the initial position, without providing a special rotation detector component, and hence makes it possible to easily avoid poor startup.

Further, the estimator calculates one or both of the γ-axis current value and the δ-axis current value from the state of energization (energized or not) by the energization controller, the electric angle at which energization control has been performed by the energization controller and the current values detected by the current detector, and determines whether the rotor 12 stops or is rotating based on the calculated one or both of the γ-axis current value and the δ-axis current value.

More specifically, the estimator determines that the rotor 12 is rotating if the calculated current value(s) (γ-axis current and δ-axis current, shown in FIG. 10) is/are more than a set threshold value(s). Their threshold value(s) may be value(s) preset as fixed value(s) at the time of design, or may be value(s) determined based on value(s) measured in the state in which the rotor 12 is not rotated by external force (e.g., no other drive sources are in operation).

In the case where the estimator makes the determination based on the current values of the U-phase, V-phase and W-phase, because the phase (U-phase, V-phase or W-phase) where current due to rotation of the rotor 12 is generated depends on the electric angle phase of the rotor 12, all the three phases need to be monitored. On the other hand, in the case where the estimator makes the determination based on the current values of the γ-axis current and the δ-axis current, the determination can be made by using only one of these. In the sensorless vector control system 1, the γ-axis current Iγ and the δ-axis current Iδ are always calculated for normal rotation control, not calculated especially for detection of the rotation of the rotor 12.

This makes it possible to determine whether the rotor 12 is rotating during estimation of the initial position (right before startup) by using only one of the current values of the γ-axis current and the δ-axis current, and hence makes it possible to more easily avoid poor startup.

Further, in the case where the γ-axis current is used, the estimator calculates the γ-axis current value generated during the period in which the γ-axis voltage is not applied.

It is preferable that the current value (base current value) be measured (calculated) at the timing that is after voltage application at an angle and right before voltage application at the next angle, the voltages being applied for estimation of the initial position, because the current value at the timing is the closest to 0 [A] (if the rotor 12 stops) and is likely to show difference from the current value in the state in which the rotor 12 is rotating. After voltage application at the last angle, there is no next voltage application, and accordingly there is no timing that is right before voltage application at the next angle. In such a case, the current value may be measured when the same time as the period of no voltage application used by then elapses.

This makes it easier to determine whether the rotor 12 stops or is rotating, and hence makes it possible to detect that the rotor 12 is rotating with high accuracy.

Figure 11:
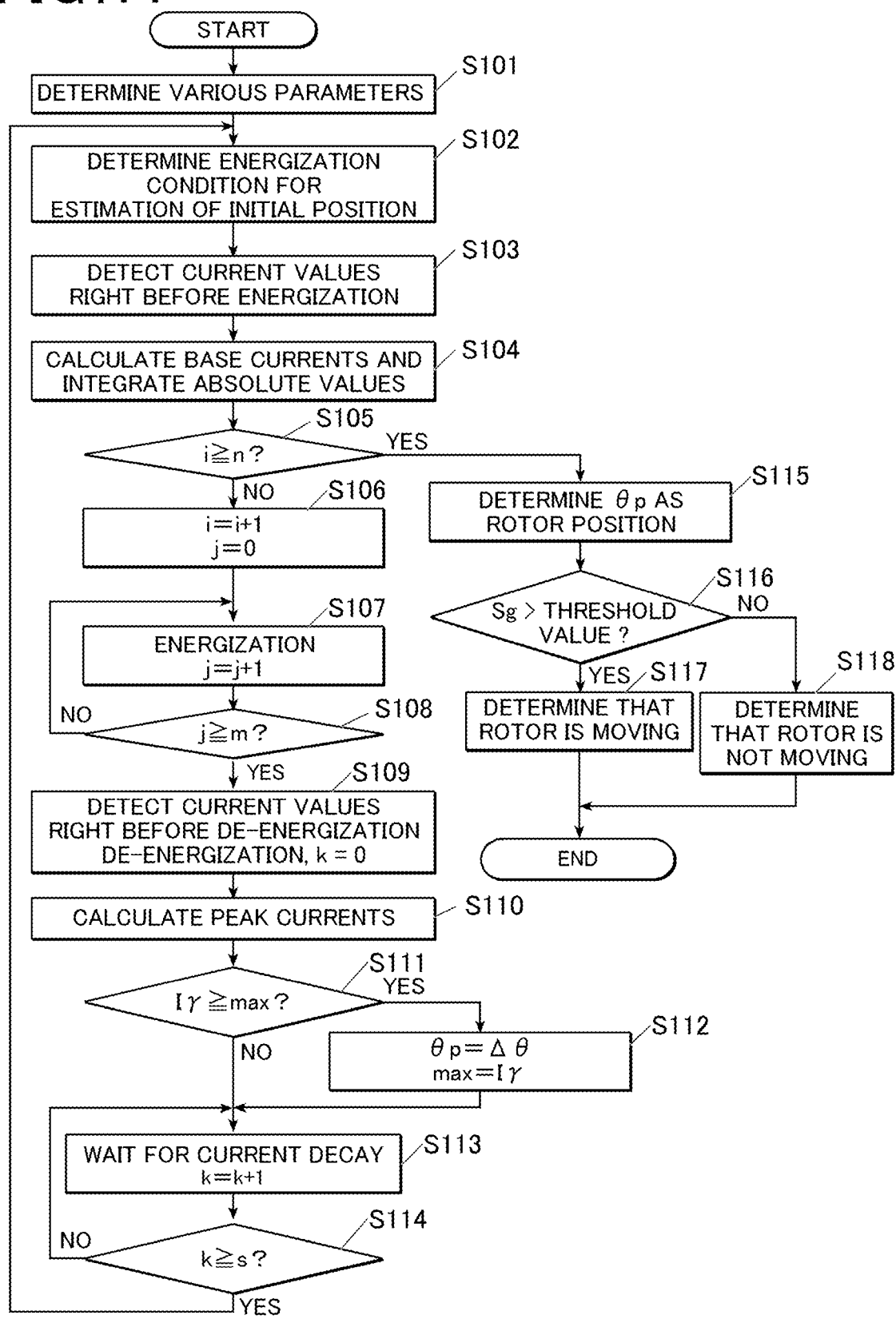
FIG. 11 is a flowchart showing an example of operation of the sensorless vector control system according to the embodiment.

Further, the estimator calculates, from the current values detected by the current detector in the state in which a γ-axis voltage pattern on at least two different electric angles is applied to the coils 11, the absolute value(s) of one or both of the γ-axis current value and the δ-axis current value at each of the electric angles (energization angles), and determines that the rotor 12 is rotating in response to the integrated value of the calculated absolute value being greater than a threshold value (Step S116 and Step S117 in FIG. 11).

This makes it possible to determine whether the rotor 12 is rotating during estimation of the initial position (right before startup) by simple calculation using the current value(s) of the γ-axis current and/or the δ-axis current, and hence makes it possible to avoid poor startup with a simple process.

Further, in response to determining that the rotor 12 is rotating during estimation of the initial position, the estimator redoes the estimation of the initial position, or may stop the estimation of the initial position. In the case where the estimator redoes the estimation of the initial position, the estimator may wait to redo the estimation of the initial position until rotation of the rotor 12 is no longer detected.

This eliminates the possibility of starting the motor 10 at the initial position estimated in the state in which the rotor 12 is rotating, and hence can surely avoid poor startup.

Further, in response to the estimator determining that the rotor 12 stops, the energization controller controls the energization pattern on the phases to rotate and start the motor, based on the initial position estimated by the estimator. That is, only if no rotation is detected during estimation of the initial position, output of the energization pattern to start the motor 10 starts, thereby starting the motor 10.

This makes it possible to start the motor 10 at the initial position estimated in the state in which the rotor 12 stops, and hence makes it possible to avoid startup failure.

Next, an embodiment of an image forming apparatus 100 to which the rotation detector of the present disclosure is applied will be described.

Figure 13:
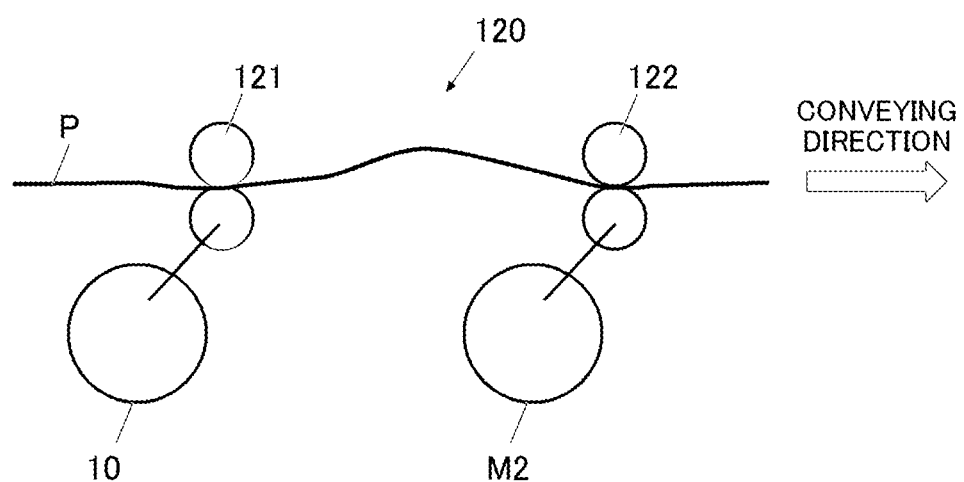
FIG. 13 shows an example of configuration of and around a paper conveyor of an image forming apparatus.
Figure 14:
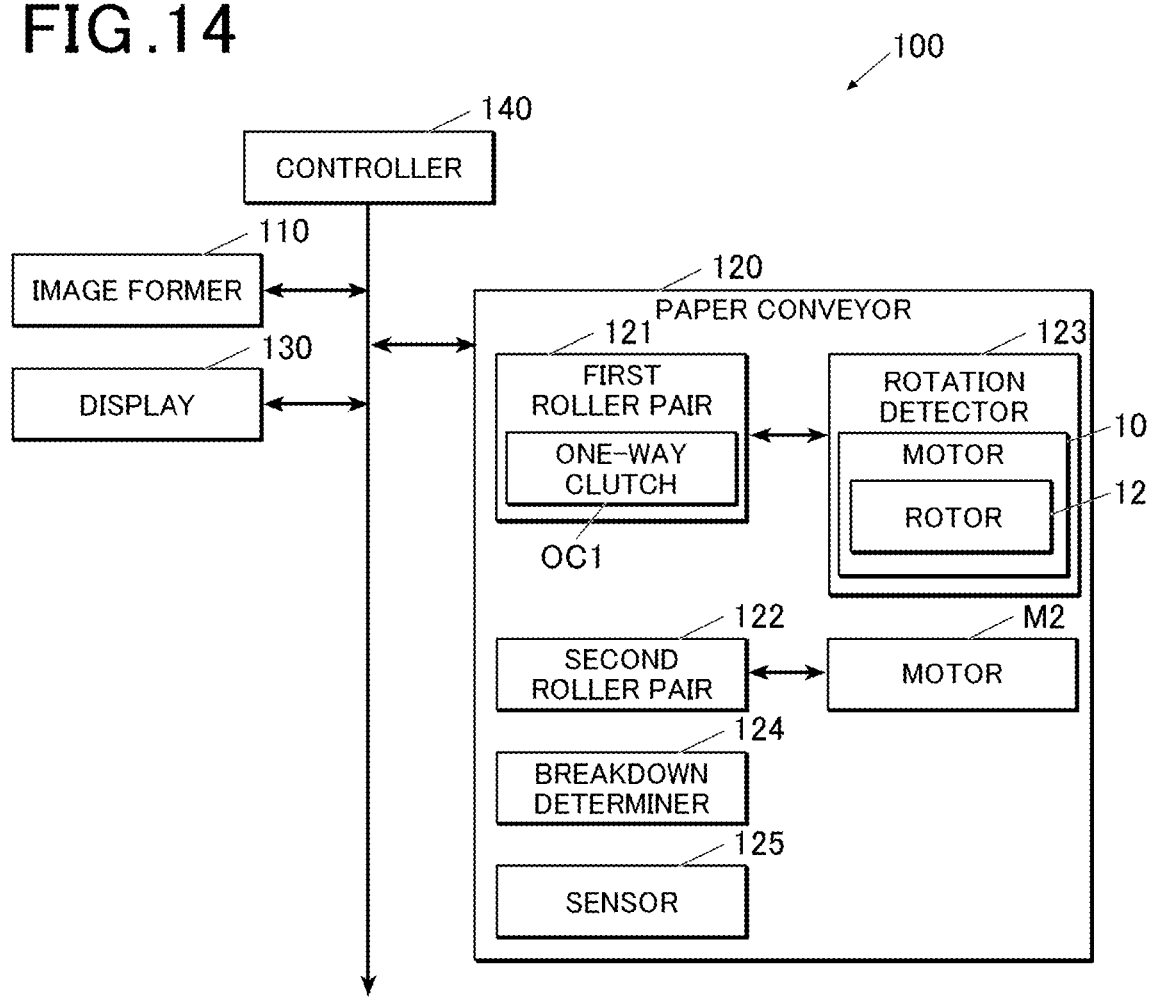
FIG. 14 is a block diagram showing a functional configuration of a control structure of the image forming apparatus.

As shown in FIG. 13 and FIG. 14, the image forming apparatus 100 of this embodiment includes an image former 110 that forms images on paper, a paper conveyor 120 that conveys paper, a display 130 and a controller 140 (hardware processor).

The image former 110 forms, on the basis of print jobs or the like, images on paper supplied from a paper feeding tray to create printed materials. The image former 110 is, what is called, an electrophotographic image former in which electrostatic latent images formed on charged photoconductors are developed to be toner images of respective colors, these toner images are superimposed on top of one another on an intermediate transfer belt and then transferred to paper, and fixed to the paper by heat and pressure, for example.

The paper conveyor 120 includes a first roller pair 121 and a second roller pair 122 disposed downstream of the first roller pair 121 in a conveying direction to convey paper P.

The first roller pair 121 is driven to rotate by the motor 10, which is a 3-phase brushless DC motor, and has a built-in one-way clutch OC1 in its transmission mechanism.

The second roller pair 122 is driven to rotate by a motor M2 (e.g., stepping motor) that is a different drive source from the motor 10.

The paper conveyor 120 further includes a rotation detector 123 that includes the motor 10 including the rotor 12 and detects rotation of the rotor 12, a breakdown determiner 124 that determines that the one-way clutch OC1 is broken if the rotation detector 123 detects rotation of the rotor 12 while the motor 10 stops, and a sensor 125 that detects ends of the paper P when the paper P held by the first roller pair 121 and the second roller pair 122 is conveyed by rotation of the first roller pair 121 and the second roller pair 122.

The display 130 is configured by a liquid crystal display (LCD), and displays various screens in accordance with display signals input from the controller 140.

The controller 140 includes a CPU, a RAM and a ROM, and reads and executes various programs from the ROM, thereby controlling the components of the image forming apparatus 100.

In the paper conveyance mechanism (paper conveyor 120) shown in FIG. 13 and FIG. 14, the one-way clutch OC1 is included in the mechanism (transmission mechanism) that drives the motor 10, which is a sensorless brushless motor, in order that even if the motor M2 as the drive source for the second roller pair 122, which is disposed downstream in the conveying direction, pulls the first roller pair 121, which is disposed upstream in the conveying direction, via the paper P, excessive load is not applied to the motor M2. Driving force for the first roller pair 121 is transmitted to the first roller pair 121. However, if the first roller pair 121 is pulled by the motor M2 and rotated faster than the number of drives/rotations (rotational speed) by the motor 10, the one-way clutch OC1 breaks the drive in the opposite rotational direction. This is to prevent the load of the motor 10 to rotate the motor 10 itself from being added to the drive load of the motor M2, thereby preventing the motor M2 from rotating poorly, and also to prevent the paper P from being excessively pulled and torn accordingly. If the motors stop with the paper P held by both the first roller pair 121 and the second roller pair 122, a loop is formed in the paper P between the first roller pair 121 and the second roller pair 122. Hence, when the drive sources (motor 10 and motor M2) are restarted to convey the paper P, control is performed to start the motor M2 first. At the time, if the amount of the loop is less than assumed, the first roller pair 121 may be pulled by the motor M2 before the motor 10 starts up, which is started after the motor M2 is started. If the one-way clutch OC1 breaks the drive at the time, no problem arises, but if the one-way clutch OC1 is broken and gets stuck, the drive is transmitted to and rotates the motor 10 for the first roller pair 121. That is, while the motor 10 is in estimation of the initial position for starting up later, the motor 10 (rotor 12) is rotated by external force, and the initial position is wrongly estimated accordingly, so that the motor 10 fails in startup rotates poorly. Consequently, the first roller pair 121 does not rotate in its normal manner and becomes a load that pulls the paper P. As a result, for example, the second roller pair 122 slips due to overload, or the motor M2 rotates poorly due to overload, and delay occurs in conveyance of the paper P and a jam occurs accordingly. When a repairer tries to identify a cause of a jam, it takes a long time for him/her to find out that the cause of the jam is breakdown of the one-way clutch OC1, so that the downtime of the image forming apparatus 100 becomes long, and customer's convenience decreases.

To deal with this, in this embodiment, in order that when a repairer tries to identify a cause of a jam, he/she can determine that it is due to breakdown of the one-way clutch OC1 and promptly proceed to repair work (which contributes to reduction of the repairer's repair time), the breakdown determiner 124 is provided to determine that the one-way clutch OC1 is broken if the rotation detector 123 detects rotation of the rotor 12 while the motor 10 stops (is in estimation of the initial position). The determination result may be displayed on the display 130 as a warning, may be shown as an indicator or in-machine information that the repairer refers to when performing maintenance, or may be notified as remote maintenance information via a network.

This allows a repairer, when trying to identify a cause of a jam, to determine that it is due to breakdown of the one-way clutch OC1, and promptly proceed to repair work, which contributes to reduction of the repair's repair time.

Even if rotation of the rotor 12 is detected during estimation of the initial position (while the motor 10 stops), it may be preferred, from the standpoint of convenience, to keep the image forming apparatus 100 usable until the actual damage (jam) occurs, not immediately stopping it or making a call for repair (displaying a message to urge the user to contact a repairer).

For such cases, the breakdown determiner 124 may determine that the one-way clutch OC1 is broken if the rotation detector 123 detects rotation of the rotor 12 while the motor 10 stops and also the detection timing of an end of the paper P by the sensor 125 is later than a predetermined timing (i.e., a jam actually occurs). The predetermined timing is timing at which it can be estimated that no abnormality in paper conveyance (jam) occurs.

This allows the user, even if the one-way clutch OC1 is broken, to keep using the image forming apparatus 1, not stopping it, until the actual damage (jam) occurs, and hence can ensure the user's convenience.

Although, in the above, one or more embodiments of the present disclosure have been described in detail, the present disclosure is not limited thereto, but can be modified in a range of not departing from its scope.

For example, in the above embodiments, the estimator calculates the absolute value(s) of one or both of the γ-axis current value and the a-axis current value at each of the electric angles, and determines that the rotor 12 is rotating in response to the integrated value of the calculated absolute value being greater than a threshold value, but not limited thereto. For example, the estimator may calculate one or both of the γ-axis current value and the a-axis current value at each of the electric angles, and determine that the rotor 12 is rotating in response to the maximum value of a positive value(s) or the maximum value of the absolute value(s) of a negative value(s) among the calculated one or both of the γ-axis current value and the a-axis current value being greater than a threshold value. In the case where negative values are used, the estimator may determine that the rotor 12 is rotating in response to not the maximum value of the absolute value but the minimum value of the negative value(s) being less than a minus threshold value.

This makes it possible to determine whether the rotor 12 is rotating during estimation of the initial position (right before startup) by simple calculation using the current value(s) of the γ-axis current and/or the a-axis current, and hence makes it possible to avoid poor startup with a simple process.

Alternatively, for example, the estimator may calculate one or both of the γ-axis current value and the a-axis current value at each of the electric angles, and determine that the rotor 12 is rotating in response to the integrated value of only a positive value(s) or the absolute value of the integrated value of only a negative value(s) among the calculated one or both of the γ-axis current value and the δ-axis current value being greater than a threshold value. In the case where negative values are used, the estimator may determine that the rotor 12 is rotating in response to not the absolute value of the integrated value but the integrated value of the negative value(s) being less than a minus threshold value.

This makes it possible to determine whether the rotor 12 is rotating during estimation of the initial position (right before startup) by simple calculation using the current value(s) of the γ-axis current and/or the δ-axis current, and hence makes it possible to avoid poor startup with a simple process.

Still alternatively, for example, the estimator may calculate the absolute value(s) of one or both of the γ-axis current value and the δ-axis current value at each of the electric angles, and determine that the rotor 12 is rotating in response to the maximum value of the calculated absolute value being greater than a threshold value.

This makes it possible to determine whether the rotor 12 is rotating during estimation of the initial position (right before startup) by simple calculation using the current value(s) of the γ-axis current and/or the a-axis current, and makes it possible to avoid poor startup with a simple process.

Further, in the above embodiments, the estimator determines whether the rotor 12 stops or is rotating at the same time as the estimation of the initial position, but not limited thereto. For example, the estimator may determine whether the rotor 12 stops or is rotating before starting estimation of the initial position. If the estimator determines that the rotor 12 stops, the estimator starts estimation of the initial position, whereas if the estimator determines that the rotor 12 is rotating, the estimator keeps (repeats) determining whether the rotor 12 stops or is rotating, and starts estimation of the initial position after confirming (determining) that the rotor 12 is not rotating. This configuration is particularly effective in cases where estimation of the initial position could be performed while the rotor 12 is still moving by inertia, such as a case where restart (rotation) is performed immediately after rotation is once stopped, because it can surely prevent restart failure.

This eliminates the possibility of estimating the initial position in the state in which the rotor 12 is rotating, and hence can surely avoid poor startup.

Further, in the above embodiments, the upper controller 20 and the sensorless vector controller 30 are separate devices, but not limited thereto. The upper controller 20 and the sensorless vector controller 30 may be configured as one device (ASIC).

The detailed configurations and operations of the components of the sensorless vector control system can be appropriately changed within a range of not departing from the scope of the present disclosure.

Although one or more embodiments or the like of the present disclosure have been described and illustrated in detail, the disclosed embodiments or the like are made for purposes of not limitation but illustration and example only. The scope of the present invention should be interpreted by terms of the appended claims.

What is claimed is:
1. A rotation detector comprising:
   a motor including coils of two or more phases and a rotor;
   a current detector that detects currents flowing in coils of at least two phases among the coils of two or more phases; and
   a hardware processor that
      estimates an initial position of the rotor based on current values of the currents detected by the current detector to start the motor, controls an energization pattern on the phases to rotate and start the motor, based on the estimated initial position, wherein the hardware processor, from a state of energization, an electric angle at which energization control has been performed and the current values detected by the current detector, calculates one or both of a γ-axis current value and a δ-axis current value during a period in which a γ-axis voltage is not applied, and determines, based on the calculated one or both of the γ-axis current value and the δ-axis current value, whether the rotor stops or is rotating before completing the estimation of the initial position.

2. The rotation detector according to claim 1, wherein the hardware processor determines whether the rotor stops or is rotating based on a state of energization and the current values detected by the current detector.

3. The rotation detector according to claim 1, wherein the hardware processor, from the current values detected by the current detector in a state in which a γ-axis voltage pattern on at least two different electric angles is applied to the coils, calculates the one or both of the γ-axis current value and the δ-axis current value at each of the electric angles, and determines that the rotor is rotating in response to a maximum value of a positive value or a maximum value of an absolute value of a negative value among the calculated one or both of the γ-axis current value and the δ-axis current value being greater than a threshold value.

4. The rotation detector according to claim 1, wherein the hardware processor, from the current values detected by the current detector in a state in which a γ-axis voltage pattern on at least two different electric angles is applied to the coils, calculates the one or both of the γ-axis current value and the δ-axis current value at each of the electric angles, and determines that the rotor is rotating in response to an integrated value of a positive value or an absolute value of an integrated value of a negative value among the calculated one or both of the γ-axis current value and the δ-axis current value being greater than a threshold value.

5. The rotation detector according to claim 1, wherein the hardware processor, from the current values detected by the current detector in a state in which a γ-axis voltage pattern on at least two different electric angles is applied to the coils, calculates an absolute value of the one or both of the γ-axis current value and the δ-axis current value at each of the electric angles, and determines that the rotor is rotating in response to a maximum value of the calculated absolute value being greater than a threshold value.

6. The rotation detector according to claim 1, wherein the hardware processor, from the current values detected by the current detector in a state in which a γ-axis voltage pattern on at least two different electric angles is applied to the coils, calculates an absolute value of the one or both of the γ-axis current value and the δ-axis current value at each of the electric angles, and determines that the rotor is rotating in response to an integrated value of the calculated absolute value being greater than a threshold value.

7. The rotation detector according to claim 1, wherein the hardware processor determines whether the rotor stops or is rotating before starting the estimation of the initial position.

8. The rotation detector according to claim 1, wherein in response to determining that the rotor is rotating during the estimation of the initial position, the hardware processor redoes the estimation of the initial position.

9. The rotation detector according to claim 1, wherein in response to determining that the rotor stops, the hardware processor controls the energization pattern on the phases to rotate and start the motor, based on the estimated initial position.

10. An image forming apparatus comprising:
an image former that forms an image on paper; and
a paper conveyor including:
the rotation detector according to claim 1, the rotation detector detecting the rotation of the rotor included in the motor;
a first roller pair; and
a second roller pair disposed downstream of the first roller pair in a conveying direction to convey the paper,
wherein the first roller pair is driven to rotate by the motor and includes a one-way clutch in a transmission mechanism,
wherein the second roller pair is driven to rotate by a drive source different from the motor, and
wherein the paper conveyor further includes a breakdown determiner that determines that the one-way clutch is broken in response to the rotation detector detecting the rotation of the rotor while the motor stops.

11. The image forming apparatus according to claim 10, wherein the paper conveyor further includes a sensor that detects an end of the paper when the paper held by the first roller pair and the second roller pair is conveyed by rotation of the first roller pair and the second roller pair, and wherein the breakdown determiner determines that the one-way clutch is broken in response to (i) the rotation detector detecting the rotation of the rotor while the motor stops and (ii) a detection timing of the end by the sensor being later than a predetermined timing.

* * * * *